(12) United States Patent
Roli et al.

(10) Patent No.: US 8,639,419 B2
(45) Date of Patent: Jan. 28, 2014

(54) AGRICULTURAL VEHICLE WITH A CONTINUOUSLY VARIABLE TRANSMISSION

(75) Inventors: Francesco Roli, Modena (IT); Eugenio Sereni, Modena (IT); Riccardo Morselli, Modena (IT)

(73) Assignee: CNH America LLC, New Holland, PA (US)

( * ) Notice: Subject to any disclaimer, the term of this patent is extended or adjusted under 35 U.S.C. 154(b) by 663 days.

(21) Appl. No.: 12/560,996

(22) Filed: Sep. 16, 2009

(65) Prior Publication Data

US 2010/0087993 A1 Apr. 8, 2010

(30) Foreign Application Priority Data

Sep. 19, 2008 (IT) ................ BO2008A0577

(51) Int. Cl.
*G06F 19/00* (2011.01)
*F16H 61/662* (2006.01)

(52) U.S. Cl.
CPC .............. *G06F 19/00* (2013.01); *F16H 61/662* (2013.01)
USPC .................... 701/50; 701/51; 701/58; 477/48

(58) Field of Classification Search
USPC .......... 701/51, 62, 53, 54, 36, 58, 50; 477/48, 477/118, 46, 40; 192/221; 180/307; 475/72; D15/10, 15, 149
See application file for complete search history.

(56) References Cited

U.S. PATENT DOCUMENTS

| | | | | |
|---|---|---|---|---|
| 4,561,327 A | * | 12/1985 | Niwa et al. | 477/118 |
| 4,620,575 A | * | 11/1986 | Cuba et al. | 477/193 |
| 4,696,380 A | * | 9/1987 | Kita | 192/221 |
| 4,823,267 A | * | 4/1989 | Kumura | 701/62 |
| 5,012,910 A | * | 5/1991 | Miyawaki | 701/53 |
| 5,062,510 A | * | 11/1991 | Shimizu | 192/220.1 |
| 5,085,104 A | * | 2/1992 | Kouno et al. | 477/40 |
| 5,109,962 A | * | 5/1992 | Sato | 477/40 |
| 5,514,050 A | * | 5/1996 | Bauerle et al. | 477/118 |
| 5,527,231 A | * | 6/1996 | Seidel et al. | 477/46 |
| 5,596,153 A | | 1/1997 | Bulgrien | |
| 6,027,425 A | * | 2/2000 | Sakaguchi et al. | 701/58 |
| 6,080,080 A | * | 6/2000 | Bolz et al. | 477/47 |
| 6,645,106 B2 | * | 11/2003 | Goo | 475/72 |
| 7,337,870 B2 | * | 3/2008 | Izukura et al. | 180/307 |
| 2004/0209718 A1 | | 10/2004 | Ishibashi | |

(Continued)

FOREIGN PATENT DOCUMENTS

EP     1541898     6/2005

*Primary Examiner* — Thomas Black
*Assistant Examiner* — Dale W Hilgendorf
(74) *Attorney, Agent, or Firm* — Sue C. Watson; Patrick Sheldrake

(57) ABSTRACT

A vehicle includes a continuously variable transmission by means of which torque is transmitted from an engine to drive wheels of the vehicle, a braking system for applying a braking force to the drive wheels and a controller for setting the transmission ratio of the transmission. Additionally, means are provided for applying to the controller a signal indicative of the engine applied torque, and means for supplying to the controller a signal to indicate application of wheel brakes. The controller is operative when the brakes are applied to discontinue setting the transmission ratio in dependence upon the speed of the drive wheels and to set the transmission ratio instead in such a manner as to minimize the absolute value of the engine output torque or the torque transmitted through the transmission or to follow a desired torque setpoint.

6 Claims, 1 Drawing Sheet

(56) References Cited

U.S. PATENT DOCUMENTS

2006/0172853 A1 8/2006 Ishibashi et al.
2006/0230920 A1 10/2006 Berg
2008/0190103 A1 8/2008 Behm \* cited by examiner

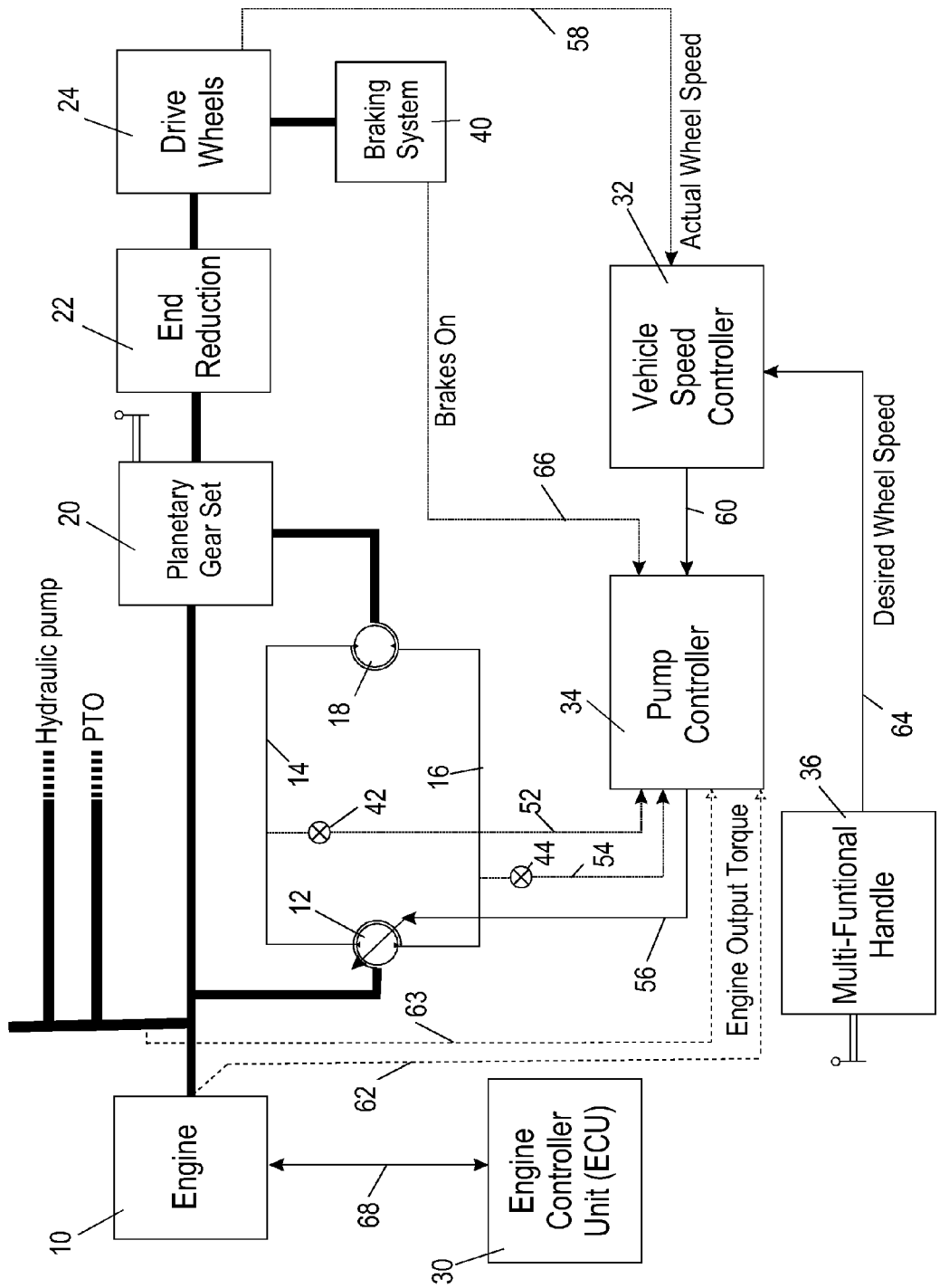

AGRICULTURAL VEHICLE WITH A CONTINUOUSLY VARIABLE TRANSMISSION

FIELD OF THE INVENTION

The present invention relates to an agricultural vehicle, such as a tractor, in which the drive train between the engine and the driven wheels includes a continuously variable transmission (CVT).

BACKGROUND OF THE INVENTION

It is known for the transmission of an agricultural vehicle, such as a tractor or a harvester, to incorporate a CVT acting in conjunction with a change speed gearbox offering multiple drive ratios. One known form of CVT is a hydrostatic transmission which comprises a variable displacement pump connected by hydraulic lines to a hydraulic motor. The torque applied to the wheels is set in this case by varying the displacement of the pump. The ensuing description will be made by reference to such a hydrostatic transmission but it should be mentioned that other forms of continuously variable transmission, such as a belt, chain, or electrically driven CVT can be used in place of a hydrostatic transmission, and reference to changing the displacement of the pump should be construed as being equivalent to varying the transmission ratio of the CVT by other means, such as by varying the geometry of the cone sheaves of a belt driven CVT.

To set the torque applied to the drive wheels by the engine, a controller is provided which varies the displacement of the pump in dependence upon the difference between the desired and actual values of the wheel speed. Thus, if the vehicle speed or the engine speed drops below the desired value, the pump displacement is adapted to match the desired vehicle or engine speed.

It is sometimes necessary to apply drive torque to the wheels at the same time as the brakes are applied. For example, at the commencement of a hill start, the engine may provide torque to counteract the force of gravity at the same time as the brakes are applied to hold the vehicle still. When the brakes are then released, the vehicle moves forward gradually. Also when driving downhill, the engine may be used in conjunction with the brakes to retard the vehicle.

If the control system setting the transmission ratio of the CVT takes no account of the applied braking torque, it cannot distinguish between applied braking torque and the reaction torque of the vehicle wheels when standing on an incline. The CVT transmission ratio will therefore be varied in order to counteract the effect of the brakes.

For this reason, it has previously been proposed to detect when the brakes are applied and, under such conditions, the transmission ratio is open loop controlled. This is not entirely satisfactory as it leads to unnecessary brake wear, it makes it difficult to achieve smooth hill starts and it risks overheating of the brakes during prolonged driving downhill.

SUMMARY OF THE INVENTION

A vehicle has a continuously variable transmission for transmitting torque from an engine to drive wheels of the vehicle, a braking system for applying a braking force to the drive wheels and a controller for setting the transmission ratio of the transmission in such a manner as to maintain a desired speed of the drive wheels or of the engine. The controller receives a signal indicative of the engine applied torque, and a signal to indicate application of wheel brakes. When the brakes are applied, the controller discontinues setting the transmission ratio in dependence upon the speed of the drive wheels and sets the transmission ratio instead in such a manner as to minimize the absolute value of the engine output torque or the torque transmitted through the transmission or to follow a desired torque setpoint.

The controller can switch between two feedback strategies depending on whether or not the brakes are applied. In the case where the CVT is a hydrostatic transmission, for example, when the brakes are not applied, the controller sets the displacement of the pump to achieve the desired wheel speed, in the conventional manner. However, when the brakes are sensed to be applied, the pump displacement is not merely set to zero. Instead, the controller varies the displacement of the pump while monitoring the load torque on the transmission. If a change in the displacement in one sense causes a reduction in the applied transmission torque, then a further displacement is made in the same sense. When a change in the pump displacement results in an increase in the transmission supplied torque then a further change is made in the opposite sense. In this way, when the brakes are applied, the transmission output torque is minimized. Thus, when the brakes are not applied, the controller acts to maintain the desired wheel or engine speed whereas, when the brakes are applied, control of the wheel speed is left to the brakes and the controller acts to minimize the absolute value of the transmission output torque. The term "absolute" value refers to the fact that it is only the magnitude of the transmission torque that is taken into consideration, without regard to the direction in which it acts. It is clear that the same control strategy may be applied to follow a given engine torque setpoint, as an example to have an additional "engine braking". In this situation the engine appears to be a "load" of the transmission.

The signal indicative to the applied engine torque may conveniently be measured by apparatus, such as that described in U.S. Pat. No. 5,596,153 which directly measures the torque transmitted through a flywheel. Alternatively, the engine applied torque may be deduced in the case of a hydrostatic transmission from the pressure in the hydraulic lines connecting the pump to the motor of the hydrostatic transmission.

The signal indicative of brake application may either be provided by an electrical switch associated with a brake pedal or it may be derived by sensing pressure in the brake lines if the brake system is operated hydraulically.

BRIEF DESCRIPTION OF THE DRAWINGS

The invention will now be described further, by way of example, with reference to the accompanying drawings, in which the single FIGURE is a diagrammatic representation of the drive train of an agricultural vehicle.

DETAILED DESCRIPTION OF THE PREFERRED EMBODIMENT

In the drawings, the thick lines represent lines along which torque is transmitted, continuous lines indicate electrical lines carrying control signals and dotted lines represent electrical lines carrying sensor signals.

The drive train comprises an engine 10 connected to an engine controller (ECU) 30 by a control cable 68. Normally, the engine is set to operate by the ECU at a constant speed selected for optimum engine performance and efficiency.

Typically a tractor is equipped with a number of different auxiliary consumers, all of which have to be provided with energy by engine 10. Implements attached to the tractor may require mechanical power from the tractor PTO and/or hydraulic energy from a hydraulic pump. Other auxiliary consumers such as trailer brake valves, steering valves, remote valve, etc. May also require hydraulic energy. The transmission however requires a large amount of torque for the propulsion of the tractor. Hence, the engine output torque $T_E$ is divided between the transmission torque $T_T$ and torque for auxiliary consumers $T_S$.

The transmission torque $T_T$ is supplied to a multi-speed planetary gear set 20 via two separate torque lines, the first $T_G$ via the gear shaft directly from the engine and the second from a CVT, in this case a hydrostatic transmission comprising a variable displacement pump 12 driven by the motor and a hydraulic motor 18 connected to the pump 12 by supply and return lines 14 and 16. The design of the gear set 20 and its layout in parallel with a hydrostatic transmission are described in detail in European Patent Publication No. EP 1541898, which is incorporated herein by reference.

The planetary gear set 20 drives an end reduction gear 22 at a speed dependent upon the speeds of its two input shafts and the prevailing setting of the transmission ratio of the planetary gear set 20. The reduction gear 22, which may be a differential, drives the wheels 24. A braking system 40 is also provided to apply torque to the drive wheels 24.

Under normal driving conditions with no brakes applied, the displacement of the pump 12 is set by a vehicle speed controller 32. The latter controller 32 receives a control signal over a line 64 from a multi-function handle which indicated the wheel speed desired by the vehicle operator. The controller 32 also receives over a line 58 a sensor signal indicative of the actual wheel speed. The desired and actual speeds are compared to generate an error signal which is relayed over a line 60 to a pump controller 34. In this mode of operation, the pump controller transmits over a control line 56 a signal for changing the position of the swash plate of the variable displacement pump in the correct sense to reduce the error signal received over the line 60. Thus, when more speed is required, the displacement is increased to increase the torque applied to the drive wheels and conversely when the desired speed is exceeded the displacement is reduced.

In operation, when accelerating from a standstill, a first gear ratio is selected in the gear set 20. The displacement of the pump 12 is then increased to increase the vehicle speed until the displacement attains a certain value. The gear ratio is then changed to the second ratio while the displacement is set to a low value. To continue accelerating, the displacement is once again increased. This process of changing gear ratios and increasing the speed by changing the pump displacement is repeated until the desired wheel speed is reached. For deceleration with engine braking, the process is essentially reversed, the pump displacement being reduced in each gear and then the next lower gear ratio is selected.

As so far described, the drive train is conventional and the mode of operation described above, that is to say closed loop control of the speed of the drive wheels 24, would normally be adopted regardless of whether or not the brakes are applied. As the control system cannot distinguish between increased gravitational resistance and braking torque, the controller 32 will attempt to increase the applied engine torque not only when the vehicle is being driven uphill but also when the brakes are applied. This is clearly undesirable as the engine and the brakes would be fighting each other, resulting in poorer braking, increased brake wear and reduced engine efficiency.

In the present invention, this problem is overcome by adopting a different control strategy when the brakes are sensed to be applied. When the brakes are on, a signal is received over a line 66 by the pump controller 34. On sensing this signal, the controller 34 disregards the speed error signal received over the line 60 from the speed controller 32 and instead sets the displacement of the pump in dependence upon the torque output of the entire transmission $T_T$ or the torque transmitted through the hydrostatic transmission.

The drawing shows signal lines 62 and 63 that can be used in the present invention. The first is a line 62 that may be connected to a transducer mounted on the engine flywheel or the engine output shaft, before the auxiliary consumers have been split off, to measure the total engine torque $T_E$. A suitable apparatus for measuring the engine output torque is described in the Applicants' earlier patent U.S. Pat. No. 5,596,153, which is incorporated herein by reference.

A second signal line 63 may be connected to a twist sensor, which measures the angular deflection of the shaft supplying torque $T_S$ to the auxiliary consumers. This angular deflection represents the transmitted torque $T_S$.

Based on the input of both signal lines 62 and 63 representing engine torque $T_E$ and torque split off to auxiliary consumers $T_S$, the pump controller 34 is able to filter the torque $T_T$ supplied to the transmission. The calculated value obtained this way allows the pump controller to generate a signal for changing the position of the swash plate of the variable displacement pump in order to minimise transmission torque $T_T$.

The alternative shown in the drawing is to measure the torque transmitted through the hydrostatic part of the transmission. Pressure sensors 42 and 44 are provided in the supply and return lines 14 and 16 connecting the variable displacement pump 12 of the hydrostatic transmission to the motor 18. The difference between the measured pressures, transmitted to the pump controller 34 over lines 52 and 54 is a measure of the torque transmitted through the hydrostatic transmission. The pressure difference in the hydraulic lines is representative for the torque $T_T$ transmitted through the transmission taken into consideration the speed ratio between the input and output shaft of the hydrostatic unit.

Another alternative is to measure the torque $T_G$ on the gear shaft, e.g. by measuring the angular deflection of the gear shaft. This torque $T_G$ is also representative for the torque $T_T$ through the transmission when the speed ratio between the input and output shaft of the hydrostatic unit is taken into consideration.

Of course, it is only necessary to use one or other of the approaches described above.

The aim of the pump controller 34, when the brakes are sensed to be on, is to minimise the transmission output or to follow a desired torque setpoint. If transmission torque $T_T$ is to be minimised, there is no single value of output torque that the transmission seeks to achieve, as this value will depend on the driving conditions. Instead the control strategy adopted within the pump controller 34 is one of continual trial and error. If one were to plot a graph of transmission output torque $T_T$ against pump displacement, one would find a minimum turning point and it is at this point that the controller 34 seeks to set the pump displacement. This it does by changing the displacement in one sense and monitoring the resulting change in engine output torque. If a decrease is sensed then the displacement is changed further in the same sense until the minimum turning point is reached. Continuing to change the displacement in the same sense will result in overshooting the minimum turning point and when this occurs the sense in which the displacement is changed is reversed.

If a desired torque setpoint is to be achieved, in other words if the hydrostatic unit is to act as a load on the transmission, then the transmission ratio of the CVT would be set in dependence on a torque error signal indicating the difference between the desired setpoint and the prevailing magnitude of the transmitted torque. This has the effect that the hydrostatic unit adds a constant braking torque to that of the braking system itself.

The drawing shows two distinct controllers 32 and 34. The two control functions have been notionally separated to highlight the fact that two different control strategies are adopted depending on whether or not the brakes are sensed to be applied. Hence the controller 32 can be considered as implementing wheel speed control when the brakes are off while the controller 34 implements torque control when the brakes are sensed to be on. It will be appreciated that in practice both control functions can be performed by suitable programming of a single microprocessor.

We claim:

1. An agricultural vehicle having a continuously variable transmission for transmitting torque from an engine to drive wheels and auxiliary consumers of the vehicle, a braking system for applying a braking force to the drive wheels, the continuously variable transmission including a hydrostatic transmission having a variable displacement pump and a motor, the vehicle comprising:

a controller configured for selecting a transmission ratio of the transmission to maintain a desired speed of the drive wheels or of the engine, the controller configured to receive a signal indicative of an engine applied torque, and a signal to indicate application of wheel brakes, wherein, when the braking system is applied to reduce the speed of the drive wheels, the controller is configured to discontinue setting the transmission ratio in dependence upon the speed of the drive wheels such that pump displacement is not set to zero by the controller when the brakes are applied, and instead the controller varies the displacement of the pump while monitoring the load torque on the transmission, the transmission ratio being set based on the engine applied torque so as to minimize the absolute value of the torque transmitted through the transmission.

2. A vehicle as claimed in claim 1, wherein the signal indicative of the engine applied torque is obtained by directly measuring the torque transmitted through a flywheel connected to the engine and filtering out torque split off to auxiliary consumers.

3. A vehicle as claimed in claim 2, wherein the signal indicative of the engine applied torque is generated from measurements of the angular deflection of the shaft supplying torque to the auxiliary consumers.

4. A vehicle as claimed in claim 1, wherein the transmission ratio is set by varying the displacement of the pump.

5. A vehicle as claimed in claim 4, wherein the signal indicative of the engine applied torque is calculated based on measuring pressure in hydraulic lines connecting the pump to the motor of the hydrostatic transmission and the speed ratio between an input and an output shaft of the hydrostatic transmission.

6. A vehicle as claimed in claim 4, wherein the signal indicative of the engine applied torque is calculated based on measuring the torque through a gear shaft of the hydrostatic transmission and the speed ratio between the input and output shaft of the hydrostatic transmission.

* * * * *